United States Patent
Kurosawa

Patent Number: 6,128,312
Date of Patent: Oct. 3, 2000

[54] CLOCK SUPPLY SYSTEM

[75] Inventor: Katsuhiko Kurosawa, Tokyo, Japan

[73] Assignee: NEC Corporation, Tokyo, Japan

[21] Appl. No.: 08/879,269

[22] Filed: Jun. 20, 1997

[30] Foreign Application Priority Data

Jun. 21, 1996 [JP] Japan .................................. 8-162161

[51] Int. Cl.$^7$ ................... H04J 3/16; H04J 3/06
[52] U.S. Cl. .................... 370/465; 370/508; 370/516; 375/356
[58] Field of Search ...................... 370/535, 468, 370/465, 503, 507, 508, 516, 517; 375/356, 371, 372

[56] References Cited

U.S. PATENT DOCUMENTS

| | | | |
|---|---|---|---|
| 4,187,402 | 2/1980 | Matsumoto | 179/15 BW |
| 4,759,018 | 7/1988 | Buchner | 370/535 |
| 5,018,135 | 5/1991 | Ashi et al. | 370/535 |
| 5,345,449 | 9/1994 | Buckingham et al. | 370/100.1 |
| 5,493,567 | 2/1996 | Boyer et al. | 370/60.1 |
| 5,610,911 | 3/1997 | Ishikawa et al. | 370/535 |
| 5,631,931 | 5/1997 | Takano et al. | 375/347 |
| 5,724,361 | 3/1998 | Fiedler | 370/537 |
| 5,790,540 | 8/1998 | Buhrgard et al. | 370/391 |
| 5,805,601 | 9/1998 | Takeda et al. | 370/535 |

FOREIGN PATENT DOCUMENTS

| | | |
|---|---|---|
| 62-276935 | 12/1987 | Japan . |
| 6-303209 | 10/1994 | Japan . |

*Primary Examiner*—Chau Nguyen
*Assistant Examiner*—Phuongchau Ba Nguyen
*Attorney, Agent, or Firm*—Scully, Scott, Murphy & Presser

[57] ABSTRACT

In each low-rate interface 1, a clock/frame pulse signal 16 is separated from a signal 11 outputted from a high-rate interface and coupled through a phase controller 6 for clock substitution in a clock substituting circuit 5. The phase controller 6 sets a phase delay as a result of design when making evaluation such that the phase of a signal 13 inputted to an exchanger 7 is coincident with the phase of its output signal 12. Thus simplifying the clock supply to low-rate interfaces in a multiplex transmission system, in which housings of a high-rate interface and the low-rate interfaces are physically separate from one another.

6 Claims, 4 Drawing Sheets

CLOCK SUPPLY SYSTEM

BACKGROUND OF THE INVENTION

The present invention relates to a clock supply system and, more particularly, to a clock supply system for multiplex transmission systems.

FIG. 4 shows a prior art clock supply system. In the system, a clock signal is generated from a clock supply circuit 3. Clock distributors 18 and 19 distribute the clock signal to their associated low- and high-rate interfaces 1 and 2. The high-rate interface 2 includes an interface circuit 10, a multiplexer/demultiplexer 9 and a clock substituting circuit 8 as well as an exchanger 7. Each of a plurality of low-rate interfaces 1 includes an interface circuit 4 and a clock substituting circuit 5.

In operation, the clock signal outputted from the clock supply circuit 3 is coupled through the clock distributors 18 and 19 to the clock substituting circuits 5 in the low-rate interfaces 1 and also to the clock substituting circuit 8 in the high-rate interface 2. The clock substituting circuits 5 and 8 substitute a system clock signal for the clock in a transmission line signal. The substituted clock is coupled through the exchanger to the multiplexer/demultiplexer or the low-rate interface circuits.

The above prior art technique uses the clock distributors for the high- and low-rate interfaces, thus posing a problem that the scale of the system is increased from the physical, circuit and power consumption standpoints.

In addition, it is necessary that the input frame phase matching is made in the exchanger. That is, it is necessary in the design to make the phase delay from the clock distributors to the exchanger to be the same in the high- and low-rate interfaces. In the design, however, it is not easy to permit the phase matching in the exchanger, and this is undesired for development.

SUMMARY OF THE INVENTION

An object of the present invention is to provide a clock supply system of a small circuit scale.

Another object of the present invention is to provide a clock supply system having high readiness of design.

According to an aspect of the present invention, there is provided, in a multiplex transmission system having high- and low-rate interfaces accommodated in physically separate housings, a clock supply system in which the low-rate interfaces are operated by using a clock signal outputted from the high-rate interface.

The high-rate interface includes a high-rate interface circuit for interfacing a high-rate signal, a multiplexer/demultiplexer for multiplexing and demultiplexing low- and high-rate signals, a clock substituting circuit for substituting a clock/frame pulse signal in the system for the clock in a transmission line signal, and an exchanger for effecting line setting of the high- and low-rate signals. A plurality of low-rate interfaces are provided and each include a low-rate interface circuit, a clock substituting circuit, and a phase controller for matching the phase of a signal from the high-rate interface coupled through the exchanger and the phase of a low-rate interface signal. The clock supply system further comprises a clock supply circuit connected as a clock source to the clock substituting circuit in the high-rate interface.

Since the low-rate interfaces are operated by using a clock/frame pulse signal, which is separated from a signal outputted from the high-rate interface, no clock signal need be supplied to the plurality of low-rate interfaces.

In addition, since each low-rate interface includes a phase controller, its output phase can be matched to the high-rate interface output phase after the design (i.e., when evaluation is made), and it is not necessary in the design to take circuit delays or the like into considerations.

Other objects and features will be clarified from the following description with reference to attached drawings.

BRIEF DESCRIPTION OF THE DRAWINGS

FIG. 1;

PREFERRED EMBODIMENTS OF THE INVENTION

Figure 1:
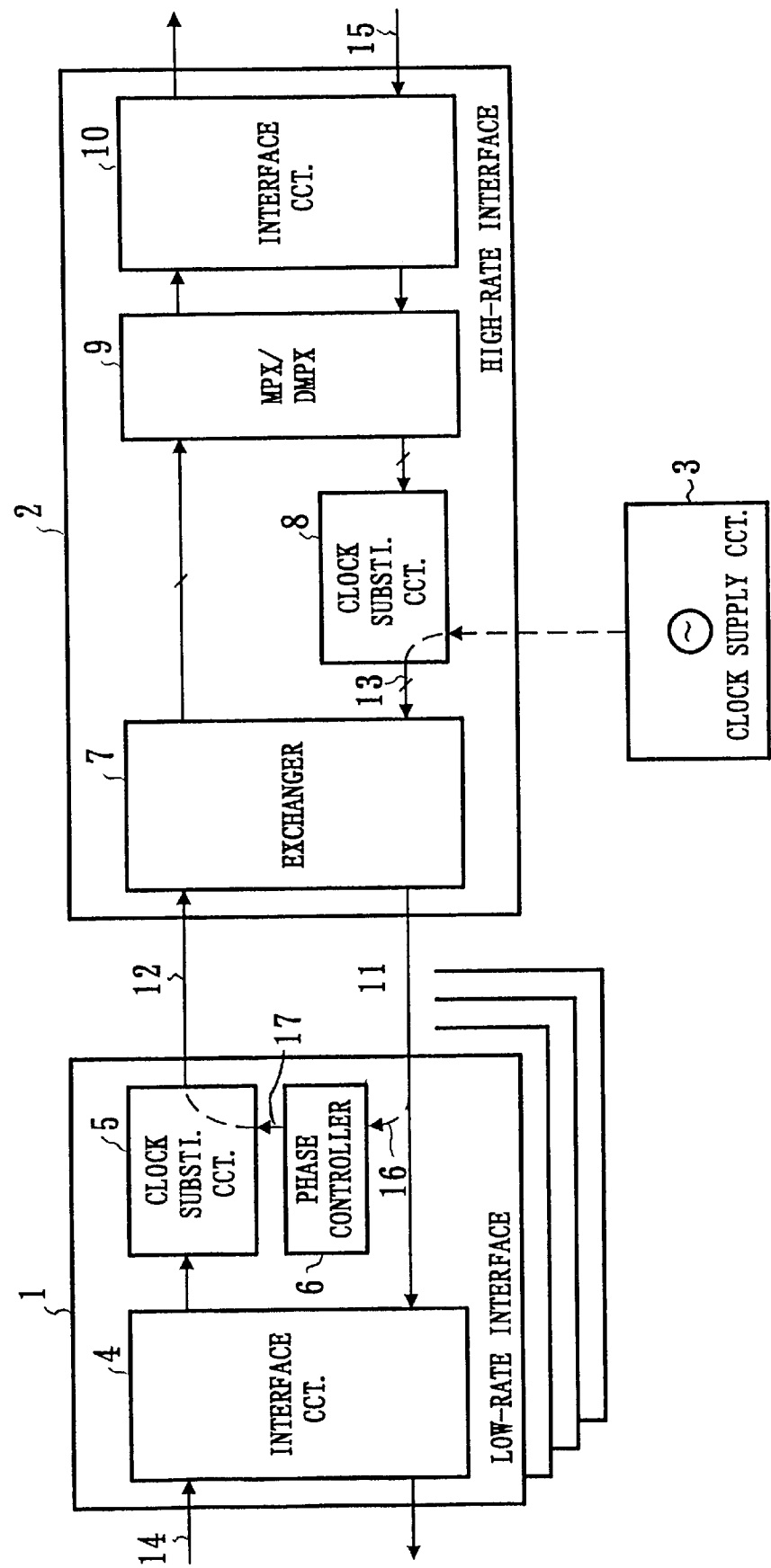
FIG. 1 shows a first embodiment of the present invention.

Embodiments of the present invention will now be described with reference to the drawings. FIG. 1 shows a first embodiment of the present invention. As shown, a high-rate interface 2 includes a high-rate interface circuit 10 for interfacing a high-rate signal 15, a multiplexer/demultiplexer 9 for multiplexing and demultiplexing low- and high-rate signals, and a clock substituting circuit 8 for substituting a system clock/frame pulse signal for the clock in a transmission line signal, and further includes an exchanger 7 for setting lines of signal provided in the high- and low-rate signals.

A plurality of low-rate interfaces 1 each have an internal construction which, like the high-rate interface, includes an interface circuit 4 and a clock substituting circuit 5, as well as a phase controller 6 for controlling the phase of a clock/frame pulse signal 16 separated from a signal inputted from the high-rate interface. The system further comprises a clock supply circuit 3 as a clock source.

Figure 2:
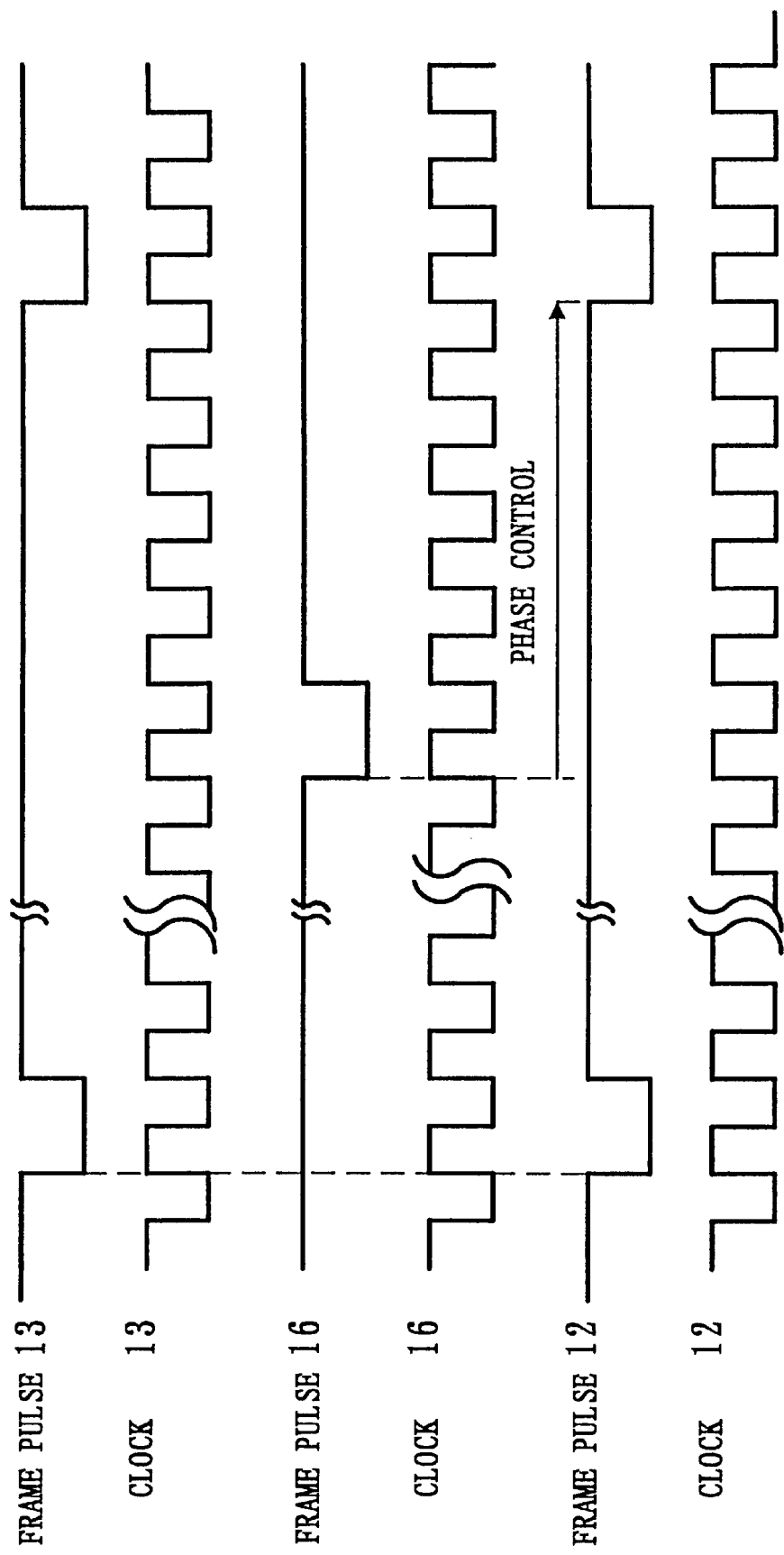
FIG. 2 shows a timing chart for explaining the operation of the embodiment shown in FIG. 1.

The operation of this embodiment will now be described with reference to FIGS. 1 and 2. A high-rate signal 15 is coupled through the interface circuit 10 to the multiplexer/demultiplexer 9 for demultiplexing. The clock substituting circuit 3 substitutes a system clock generated in the clock supply circuit 3 for the signal outputted from the multiplexer/demultiplexer 9. A low-rate signal 14 is coupled through the interface circuit 4 to the clock substituting circuit 5 for the substitution of the system clock.

The signals produced with the substitution of the system clock are inputted to the exchanger 7 for line setting before being outputted to the high- and low-rate interfaces. Signals outputted to the high-rate interface are multiplexed in the multiplexer/demultiplexer 9, and the resultant multiplexed signal is outputted through the interface circuit 10 to the outside of the system.

In the low-rate interface, a clock/frame pulse signal 16 is separated from the signal outputted from the exchanger 7 and supplied to the phase control circuit 6. The phase control circuit 6 can control the phase for one frame cycle as shown in FIG. 2. With one frame cycle period provided for the phase control, the signal 12 outputted from the phase substituting circuit 5 can be set to be in phase with the high-rate interface output signal 13 inputted to the exchanger 7 irrespective of how the signal 16 is out of phase with the signal 13.

Figure 3:
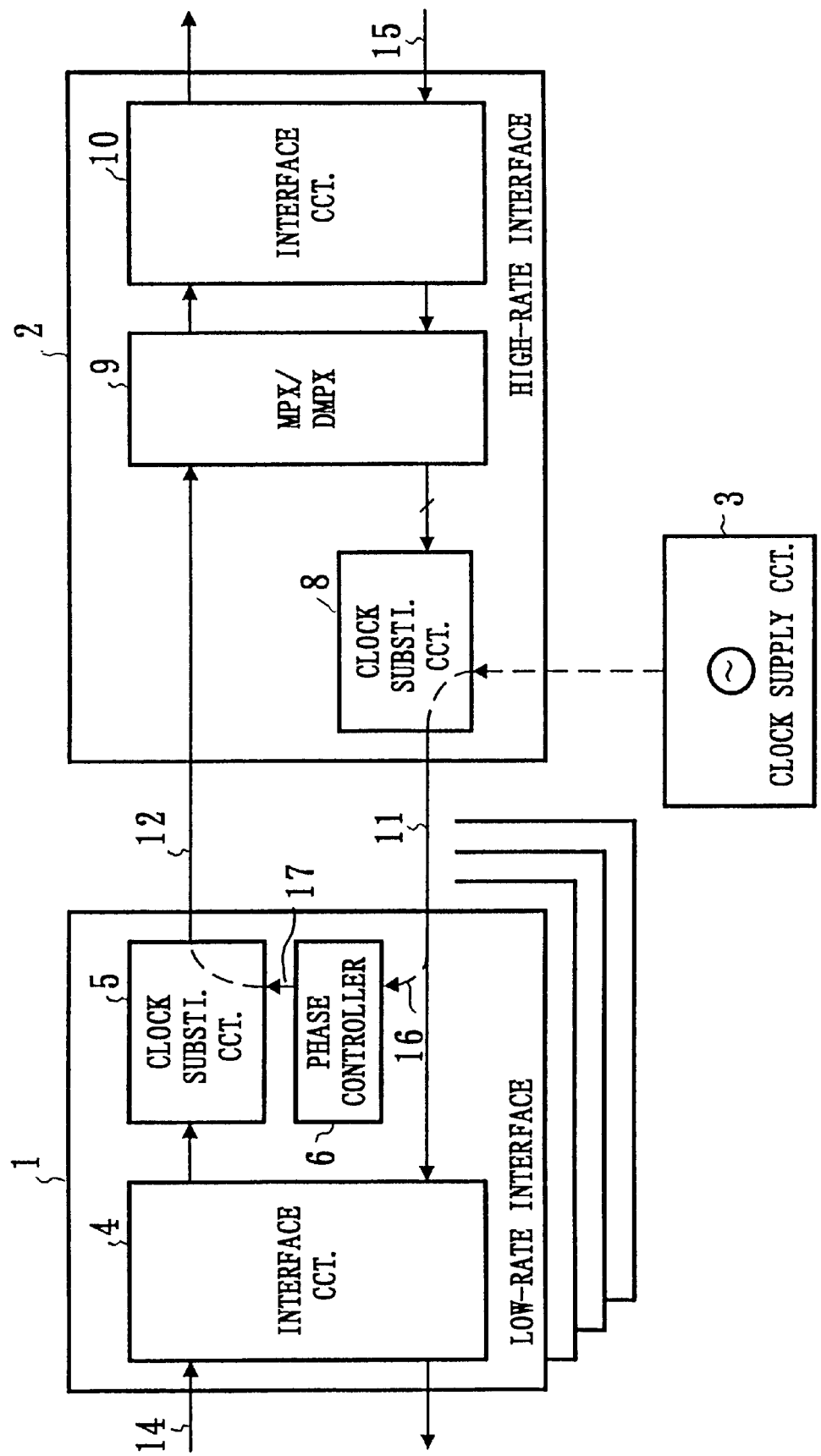
FIG. 3 shows a second embodiment of the present invention.
Figure 4:
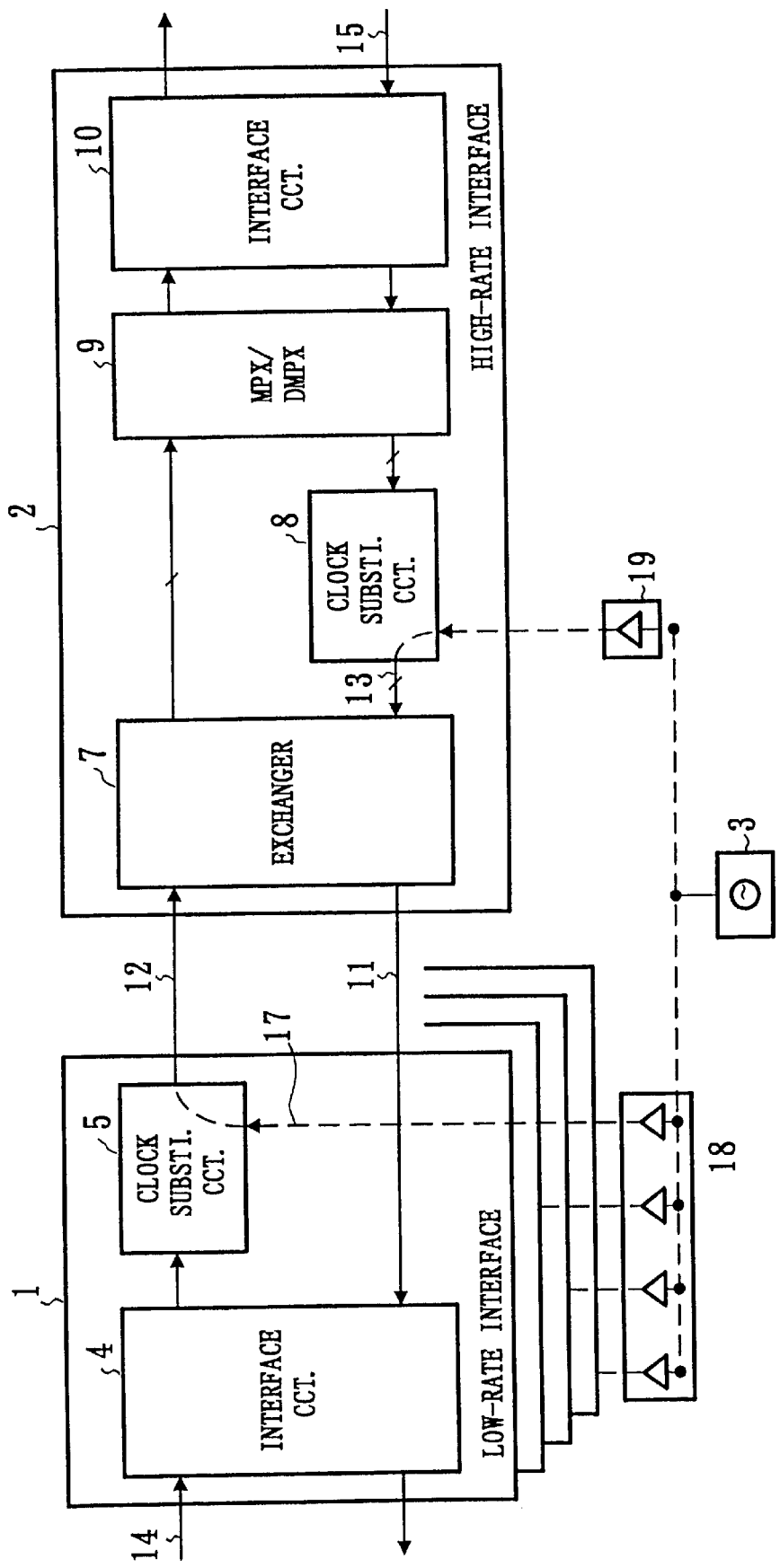
FIG. 4 shows a prior art clock supply system.

FIG. 3 shows a second embodiment of the present invention. This embodiment does not include the exchanger 7 shown in FIG. 1.

In the low-rate interface 1, the clock/frame pulse signal 16 separated from the signal 11 outputted from the clock substituting circuit 8 in the high-rate interface 2, is coupled through the phase controller 6 to the clock substituting circuit 5 for the substitution of the system clock. The multiplexer/demultiplexer 9 cannot multiplex signals from the plurality of low-rate interfaces unless these signals are all in phase. Where the circuits of the plurality of low-rate interfaces are not alike, the input signals to the multiplexer/demultiplexer may not all be in phase. The phase controller 6 can control the phase so that the inputs to the multiplexer/demultiplexer are all in phase.

As has been described in the foregoing, according to the present invention the low-rate interfaces are operated by using the clock/frame pulse signal separated from the signal outputted from the high-rate interface. It is thus possible to simplify the method of clock supply to the low-rate interfaces and reduce the physical scale, power consumption, etc.

In addition, according to the present invention each low-rate interface includes a phase controller, and it is thus possible to make phase control to make up for signal delays after the completion of the design. This means that a circuit may be designed without need of taking signal delays into considerations. It is thus possible to reduce the risk of design errors.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. In a multiplex transmission system having a high-rate interface and a plurality of low-rate interfaces accommodated in physically separate housings, a clock supply system including a system clock producing a system clock signal for the high-rate interface, and wherein the high-rate interface outputs the system clock signal from the system clock to the low-rate interfaces which are operated by using the system clock-signal outputted form the high-rate interface, and each low-rate interface includes a low-rate interface circuit and a phase controller for matching the phase of the signal from the high-rate interface with the phase of a low-rate interface signal.

2. The clock supply system according to claim 1, wherein the high-rate interface includes a high-rate interface circuit for interfacing a high-rate signal, a multiplexer/demultiplexer for multiplexing and demultiplexing low-rate and high-rate signals, and a clock substituting circuit for substituting a clock/frame pulse signal outputted by the system clock for the clock in a transmission line signal.

3. The clock supply system according to one of claims 1 and 2, wherein each low-rate interface further includes a clock substituting circuit.

4. The clock supply system according to claim 2, wherein the system clock is connected as a clock source to the clock substituting circuit in the high-rate interface.

5. The clock supply system according to claim 2, wherein the high-rate interface further includes an exchanger for effecting line setting of the high-rate and low-rate signals.

6. The clock supply system according to claim 1, wherein the high-rate interface includes a multiplexer/demultiplexer for multiplexing and demultiplexing low-rate signals for the low-rate interface and high-rate signals for the high-rate interface, such that the low-rate interface does not include a multiplexer/demultiplexer.

* * * * *

UNITED STATES PATENT AND TRADEMARK OFFICE
CERTIFICATE OF CORRECTION

PATENT NO. : 6,128,312
DATED : October 3, 2000
INVENTOR(S) : K. Kurosawa

It is certified that error appears in the above-identified patent and that said Letters Patent is hereby corrected as shown below:

Column 1,
Line 22: "The substituted" should read -- The transmission line signal with a substituted --
Line 56: "include" should read -- includes --

Column 2,
Line 11: Delete -- Fig. 1; --

Signed and Sealed this

Thirty-first Day of July, 2001

Attest:

NICHOLAS P. GODICI
Attesting Officer   Acting Director of the United States Patent and Trademark Office